June 10, 1947. H. R. MARSHALL 2,421,798
DASHER FOR CHURNS
Filed July 8, 1946
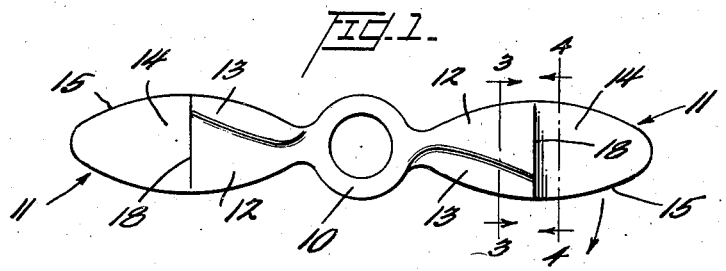
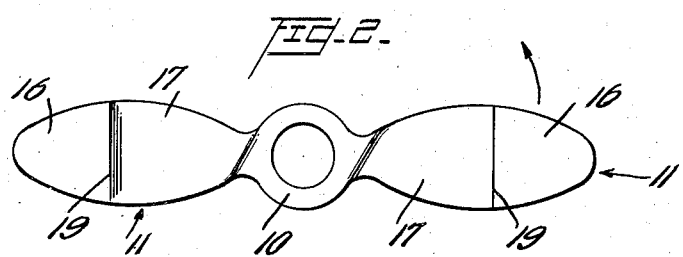
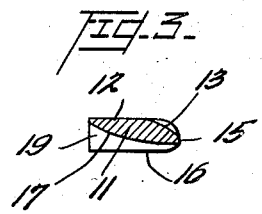
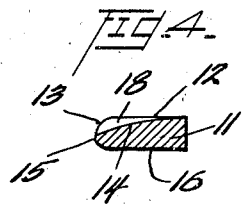
Inventor
Herman R. Marshall,
By Cushman, Darby & Cushman
Attorneys Patented June 10, 1947

2,421,798

UNITED STATES PATENT OFFICE 2,421,798

DASHER FOR CHURNS

Herman R. Marshall, Carrollton, Ga.

Application July 8, 1946, Serial No. 681,886

3 Claims. (Cl. 259—126)

In the churning of milk to separate and agglomerate the butter fat content into globules it is desirable to produce maximum agitation of the whole milk with a minimum expenditure of power, in order that the churning period may be reduced and the globular conditioning of the fats expedited.

These results are dependent on various factors, but one of the most important is the type of dasher used. It must be of such shape as to produce complete and rapid mixing of the milk, with opposed and conflicting currents, so that separation of the milk into its constituent elements will be expeditiously done. All rotary dashers have a tendency to set up centrifugal currents, with resultant return currents, due to wall repulsion of the centrifugal currents coming from the dasher. Some dashers have been provided which set up other current actions by reason of their conformation, which additional currents tend to separate the butter fat.

The invention has to do with blade conformation for rotary dashers. Its design is such that a multiplicity of currents effective to thoroughly agitate the milk and bring about rapid separation are set up, and such results are, by reason of the novel conformation of the dasher blades, accomplished without excessive demand on the power producing equipment for driving the dasher.

In this specification, and in the accompanying drawings which form a part of the disclosure, one embodiment of the invention is disclosed, but this disclosure, it is to be understood, is illustrative and not restrictive, as mechanical variations of the particular construction found herein may obviously be made and yet remain within the range of the disclosure and the appended claims which define the invention.

In the drawings:

Figure 1 is a plan view of a dasher embodying the invention.

Figure 2 is a plan view of the dasher in reversed position from that in Figure 1, to show the relative positions of the blade surfaces to one another on opposite sides of the blades.

Figure 3 is a view in cross section on line 3—3, Figure 1.

Figure 4 is a view in cross-section on line 4—4, Figure 1.

Reference numbers used in describing the construction are applied to the drawings, and the same numbers designate the same parts in the several views. The dasher has a hub 10, which may be of any usual or suitable design, which hub has an aperture to receive a driving shaft (not shown), to which shaft it may be secured in any suitable fashion, said shaft being powered from any suitable source. From hub 10 extend blades 11, two being here shown. Two are preferable for economy of construction and operation, but it will be understood that more than two may be employed if desired.

Blades 11 are of generally elliptical form in plan to eliminate any sharp edge angles and to promote easy thrust of the blades through the liquid. The blade surfaces, which are important because liquid flow resulting from their action is the determining factor in butter production, are identical in form, except that such surfaces are in reverse relation on opposite sides of the blades. Each blade has on one side a flat surface 12 at its inner end adjacent the hub, the opposite leading edges 13 of such flat surfaces 12 being rounded off or inclined. The inclining of these leading edges tends to create an upward current of the liquid on opposite sides of the center of revolution, and adds materially to liquid agitation. These opposite edges 13 are the leading edges of the blades, as the dasher is rotated in the direction of the arrow, Figs. 1 and 2. The ends of the blade, as shown in Figure 1, have inclined surfaces 14 next to the flat surfaces 12, which inclined impelling surfaces are reversely placed so as to set up upwardly moving currents in the same direction as the dasher is rotated. These inclined surfaces give pronounced upward currents, and, as they are inclined downwardly toward the leading edges of the blades a relatively narrow blade edge 15 is presented in the direction of rotation of the blades, thus reducing resistance to rotation and conserving power.

On their opposite sides (see Fig. 2), blades 11 are provided with flat surfaces 16 at their outer ends, and inclined surfaces 17 at their inner ends next to the hub 10, such flat and inclined surfaces being in reversed relation to the flat and inclined surfaces 12 and 14 on the opposite side of the blade, as shown in Figure 1. Thus, it will be seen that the blade has surfaces lying in the plane of rotation of the dasher and surfaces inclined to the plane of rotation and that the surfaces on opposite sides of the blade are reversely placed lengthwise relative to one another.

With the flat and inclined surfaces disposed as shown and described, it will be seen that inclined surfaces 14 on one side of the blades will create strong upwardly moving currents, while oppositely inclined surfaces 17 on the opposite side of the blades will create strong downwardly moving currents. Centrifugal currents will be generated by the rotation of the dasher, and such action will be increased by reason of transversely placed vertical shoulders 18 (see Fig. 1) between the flat surfaces 12 and the inclined surfaces 14, as they so act on the liquid as to move it centrifugally. On the opposite side of the blades the transverse shoulders 19, between the flat end surfaces 16 and the inclined surfaces 17 adjacent the hub 10, tend to resist centrifugal movement and thus set up counter currents as centrifugal flow is repulsed on contact with shoulders 19.

With this conformation of blades, strong and diverse currents are set up which result in a rapid and thorough mixing and separating of the whole milk into its constituents, and formation of butter lumps and globules is expedited. Further, the design of the blades is such that resistance to rotation is reduced and a worthwhile saving in power effected. Manufacture of the dasher is simple. A blank of any suitable material, preferably metal, aluminum being one useful type of metal, may be stamped, forged, or otherwise formed to give the general shape desired. Its hub may be drilled to form the hole for the driving shaft. The reversely placed inclines may be machined off, and the inclines for the leading edges of the inner flat faces may be machined. No complicated forms are involved and no difficult machining is necessary.

I claim:

1. A blade for rotary churn dashers having surfaces lying in the plane of rotation of the dasher and surfaces inclined to the plane of rotation, said surfaces on opposite sides of the blade being reversely placed lengthwise relative to one another.

2. A blade for rotary churn dashers having surfaces lying in the plane of rotation of the dasher and surfaces inclined to the plane of rotation, said surfaces on opposite sides of the blade being reversely placed lengthwise relative to one another, the surfaces of the blade in the plane of rotation having inclined leading edges.

3. A blade for rotary churn dashers having surfaces lying in the plane of rotation of the dasher and surfaces inclined to the plane of rotation, said surfaces on opposite sides of the blade being reversely placed lengthwise relative to one another, and surfaces on the same side of the blade having between them transverse vertical shoulders.

HERMAN R. MARSHALL.

REFERENCES CITED

The following references are of record in the file of this patent:

UNITED STATES PATENTS

| Number | Name | Date |
|---|---|---|
| 1,519,746 | Valerius | Dec. 16, 1924 |
| 1,658,460 | Nichols | Feb. 7, 1928 |
| 2,376,722 | Podell | May 22, 1945 |